US008063906B2

(12) United States Patent
Belliveau et al.

(10) Patent No.: US 8,063,906 B2

(45) Date of Patent: Nov. 22, 2011

(54) MULTIPARAMETER STAGE LIGHTING APPARATUS WITH GRAPHICAL OUTPUT

(75) Inventors: Richard S. Belliveau, Austin, TX (US); Thomas Edward Grimes, Austin, TX (US)

(73) Assignee: Barco Lighting Systems, Inc., Austin, TX (US)

( * ) Notice: Subject to any disclaimer, the term of this patent is extended or adjusted under 35 U.S.C. 154(b) by 855 days.

(21) Appl. No.: 12/123,514

(22) Filed: May 20, 2008

(65) Prior Publication Data

US 2009/0190346 A1 Jul. 30, 2009

Related U.S. Application Data

(63) Continuation-in-part of application No. 12/020,038, filed on Jan. 25, 2008.

(51) Int. Cl.

| | |
|---|---|
| *G06T 13/00* | (2011.01) |
| *G06T 15/00* | (2011.01) |
| *G06F 3/038* | (2006.01) |
| *G06F 1/00* | (2006.01) |
| *H05B 37/00* | (2006.01) |
| *B60Q 1/26* | (2006.01) |
| *F21V 9/00* | (2006.01) |

(52) U.S. Cl. ........ 345/473; 345/419; 345/204; 315/291; 315/320; 362/231; 362/232; 362/227

(58) Field of Classification Search ........................ None
See application file for complete search history.

(56) References Cited

U.S. PATENT DOCUMENTS

| | | | | |
|---|---|---|---|---|
| 4,392,187 | A | 7/1983 | Bornhorst | 362/233 |
| 4,962,687 | A | 10/1990 | Belliveau et al. | 84/464 R |
| 5,752,766 | A | 5/1998 | Baily | 362/250 |
| 6,016,038 | A | 1/2000 | Mueller et al. | 315/291 |
| 6,357,893 | B1 | 3/2002 | Belliveau | 362/285 |
| 6,908,214 | B2 * | 6/2005 | Luk | 362/249.02 |
| 2003/0057887 | A1 * | 3/2003 | Dowling et al. | 315/291 |
| 2003/0112148 | A1 * | 6/2003 | Belliveau | 340/825.71 |
| 2006/0158461 | A1 * | 7/2006 | Reese et al. | 345/620 |

OTHER PUBLICATIONS

Product-Easy Color- PDF http://www.ayrton-light.com/down.productsspecific/easycol2.specif.uk.pdf, Aryton located in Longjumeau, France, 2006.

High End Systems Brochure 2000.

ProLight Opto Technology Corporation, ProLight PG1X-3LIFE, 3W RGB Power LED, Technical Datasheet, Version 2.6, 12 pages, 2006.

U.S. Appl. No. 11/516,822, filed Sep. 27, 2006, Belliveau.

* cited by examiner

*Primary Examiner* — Xiao M. Wu
*Assistant Examiner* — Tize Ma
(74) *Attorney, Agent, or Firm* — Walter J. Tencza, Jr.

(57) ABSTRACT

A multiparameter stage lighting apparatus is provided comprising a lamp housing, which may include a plurality of sets of light emitting diodes, each set of light emitting diodes having a plurality of colors, the plurality of sets of light emitting diodes forming an additive color mixing system. The multiparameter stage lighting apparatus may further include a plurality of pie shaped light emitting circuit boards, one light emitting circuit board for each set of the plurality of sets of light emitting diodes, each set of the plurality of sets of light emitting diodes mounted to its respective light emitting circuit board. The multiparameter stage lighting apparatus may further include a plurality of light emitting diode signaling circuit boards, one for each of the plurality of pie shaped light emitting circuit boards. Each of the plurality of light emitting diode signaling circuit boards may be connected to its corresponding pie shaped light emitting circuit boards by a corresponding one of a plurality of multiconductor cables.

10 Claims, 9 Drawing Sheets

MULTIPARAMETER STAGE LIGHTING APPARATUS WITH GRAPHICAL OUTPUT

CROSS REFERENCE TO RELATED APPLICATION(S)

The present application is a continuation in part of and claims the priority of U.S. patent application Ser. No. 12/020,038, titled "MULTIPARAMETER STAGE LIGHTING APPARATUS WITH GRAPHICAL OUTPUT", filed on Jan. 25, 2008.

FIELD OF THE INVENTION

This invention relates to multiparameter stage lighting fixtures.

BACKGROUND OF THE INVENTION

Multiparameter lighting fixtures are lighting fixtures, which illustratively have two or more individually remotely adjustable parameters such as focus, color, image, position, or other light characteristics. Multiparameter lighting fixtures are widely used in the lighting industry because they facilitate significant reductions in overall lighting system size and permit dynamic changes to the final lighting effect. Applications and events in which multiparameter lighting fixtures are used to great advantage include showrooms, television lighting, stage lighting, architectural lighting, live concerts, and theme parks. Illustrative multi-parameter lighting fixtures are described in the product brochure showing the High End Systems product line for the year 2000 and are available from High End Systems, Inc. of Austin, Tex.

Multiparameter lighting fixtures are commonly constructed with a lamp housing that may pan and tilt in relation to a base housing so that light projected from the lamp housing can be remotely positioned to project on the stage surface. Commonly a plurality of multiparameter lights are controlled by an operator from a central controller. The central controller is connected to communicate with the plurality of multiparameter lights via a communication system. U.S. Pat. No. 4,392,187 titled "Computer controlled lighting system having automatically variable position, color, intensity and beam divergence" to Bornhorst and incorporated herein by reference, disclosed a plurality of multiparameter lights and a central controller.

The lamp housing of the multiparameter light contains the optical components and the lamp. The lamp housing is rotatably mounted to a yoke that provides for a tilting action of the lamp housing in relation to the yoke. The lamp housing is tilted in relation to the yoke by a motor actuator system that provides remote control of the tilting action by the central controller. The yoke is rotatably connected to the base housing that provides for a panning action of the yoke in relation to the base housing. The yoke is panned in relation to the base housing by a motor actuator system that provides remote control of the panning action by the central controller.

Multiparameter lights may be constructed with various light sources. U.S. Pat. No. 6,357,893 to Belliveau, incorporated by reference herein, discloses various multiparameter lighting devices that have been constructed using light emitting diodes (LEDs) as light sources. U.S. Pat. No. 6,357,893 to Belliveau discloses a multiparameter light constructed of a plurality of LEDs that can individually vary the intensity of the light sources of the same wavelength or color in relation to each other.

U.S. patent application Ser. No. 11/516,822, to Belliveau, filed on Sep. 27, 2006, incorporated by reference herein, discloses that a plurality of LEDS may be constructed of a plurality of red, green and blue LEDs. In that application, a red, green and blue LED of the plurality of LEDs may be constructed as to emit their combined light from a single output aperture that produces an homogenous color blend to the eye.

SUMMARY OF THE INVENTION

One or more embodiments of the present invention disclose a multiparameter stage lighting fixture constructed of a plurality of multiple wavelength LEDs. It has been found by the inventors of this application that a multiparameter stage lighting fixture of an embodiment of the present invention can be constructed of a system and method that can provide creative graphical control over a plurality of LED light sources.

In at least one embodiment of the present invention a multiparameter stage lighting apparatus is provided comprising a lamp housing. The lamp housing may be comprised of a plurality of sets of light emitting diodes, each set of light emitting diodes having a plurality of colors, the plurality of sets of light emitting diodes forming an additive color mixing system. The multiparameter stage lighting apparatus may further include a plurality of pie shaped light emitting circuit boards, one light emitting circuit board for each set of the plurality of sets of light emitting diodes, each set of the plurality of sets of light emitting diodes mounted to its respective light emitting circuit board. The multiparameter stage lighting apparatus may further include a plurality of light emitting diode signaling circuit boards, one for each of the plurality of pie shaped light emitting circuit boards. A plurality of multiconductor cables may also be provided, one for each of the plurality of pie shaped light emitting circuit boards. Each of the plurality of light emitting diode signaling circuit boards may be connected to its corresponding pie shaped light emitting circuit boards by a corresponding one of the plurality of multiconductor cables. The multiparameter stage lighting apparatus may further include a base housing. The lamp housing may be remotely positionable in relation to the base housing.

Each of the plurality of multiconductor cables may be a multiconductor flat cable. Each of the plurality of light emitting diode signaling circuit boards may be shaped in a pie shape. The multiparameter stage lighting apparatus may further include a communications port, and a memory. The communications port may receive a first graphical content program and the memory may store the first graphical content program.

DETAILED DESCRIPTION OF THE DRAWINGS

Figure 1:
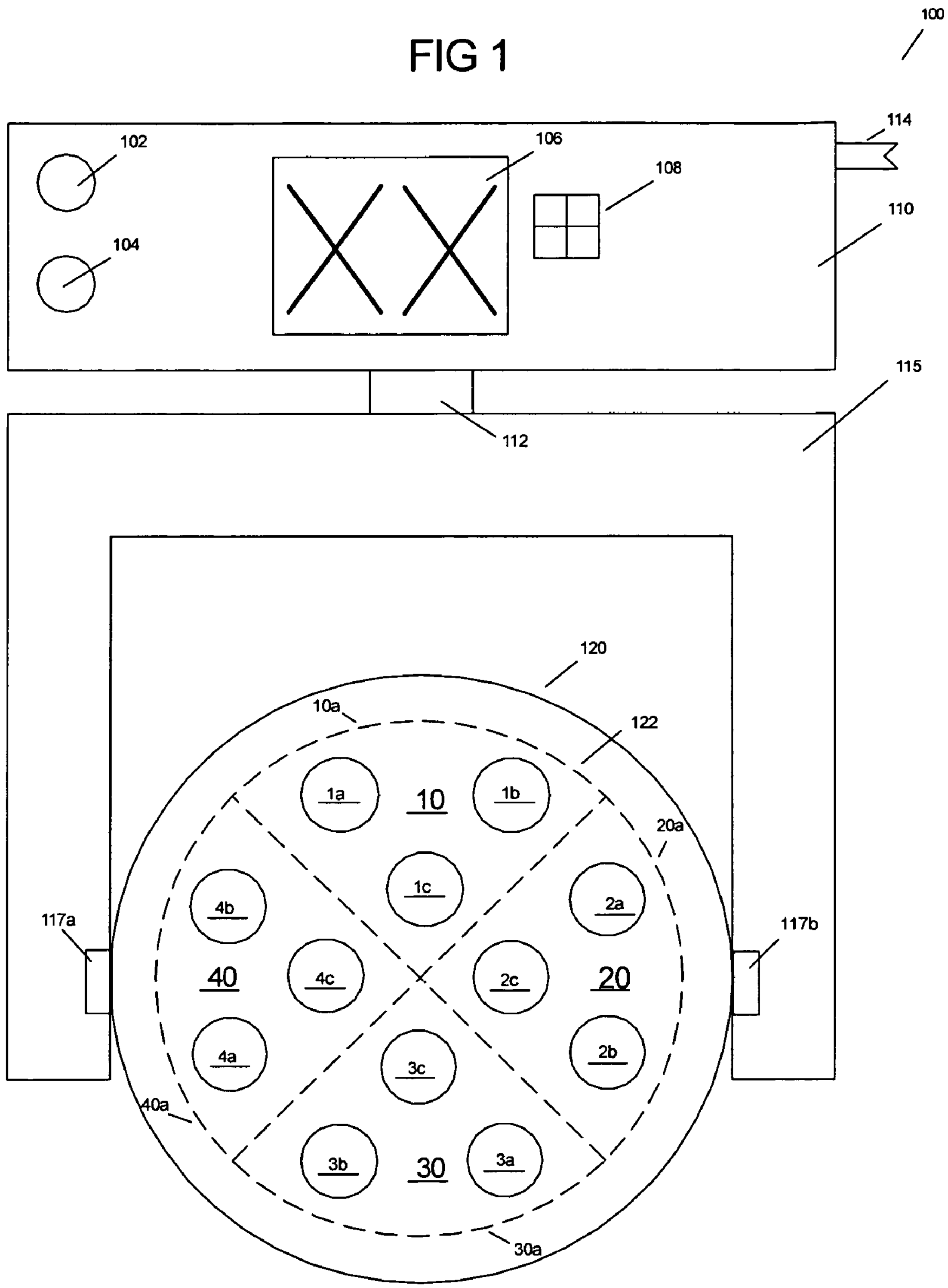
FIG. 1 shows a multiparameter light in accordance with an embodiment of the present invention, with the a plurality of LED mounting substrates or a plurality of LED light emitting circuit boards.

In the description that follows, like parts are marked throughout the specification and drawings with the same reference numerals, respectively. The drawing figures are not necessarily to scale. Certain features of embodiments of the present invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

In particular, various embodiments of the present invention provide a number of different methods and apparatus for operating and controlling multiparameter stage lights. The concepts of the invention are discussed in the context of multiparameter lighting stage lights but the use of the concepts of the present invention is not limited to multiparameter stage lights and may find application in other lighting and other visual systems where control of the system is maintained from a remote location and to which the concepts of the current invention may be applied.

FIG. 1 shows a multiparameter light 100 in accordance with an embodiment of the present invention. The multiparameter light 100 includes a lamp housing 120 and a base housing 110. The multiparameter light 100 is capable of remotely panning and tilting the lamp housing 120 in relation to the base housing 110. The lamp housing 120 is mounted by bearings 117*a* and 117*b* so that the lamp housing 120 can tilt in relation to the yoke 115. The yoke 115 is attached to the base housing 110 by bearing 112 that allows the yoke 115 and the lamp housing 120 to pan in relation to the base housing 110. The lamp housing 120 is remotely tilted in relation to the yoke 115 by a first motor actuator (not shown for simplicity). The yoke 115 is remotely panned in relation to the base housing 110 by a second motor actuator (not shown for simplicity).

A first communication connector 102 and a second communication connector 104 are shown mounted to the base housing 110. An alpha numeric display 106 and an input keypad 108 are shown as components of the base housing 110. A section of a mains input power cord 114 is shown as a component of the base housing 110.

The lamp housing 120 shows four LED emitting circuit boards 10, 20, 30 and 40 as components of the lamp housing as shown by dashed lines. The LED emitting circuit boards 10, 20, 30, and 40 may be configured so that they are physically separate, i.e. not attached together or are easily detachable from one another. The LED emitting circuit boards 10, 20, 30, and 40 may also be configured and/or shaped so that while separate, or easily separable, they can come together or fit together as a unit. For example the emitting circuit boards 10, 20, 30, and 40 of FIG. 1 are pie shaped so that they can fit together in one circular shape. The four LED emitting circuit boards 10, 20, 30, and 40 are shaped into pie-shaped circuit boards with the radial component of each board shown by 10*a*, 20*a*, 30*a* and 40*a* used to form circumference 122. The circuit boards could also be shaped as a triangle (not shown) instead of being shaped pie-shaped but then the circumference 122 would become a polygon. LED emitting circuit board 10 has a plurality of LEDs 1*a*, 1*b* and 1*c* mounted thereon. LED emitting circuit board 20 has a plurality of LEDs 2*a*, 2*b* and 2*c* mounted thereon. LED emitting circuit board 30 has a plurality of LEDs 3*a*, 3*b* and 3*c* mounted thereon. LED emitting circuit board 40 has a plurality of LEDs 4*a*, 4*b* and 4*c* mounted thereon.

Figure 2:
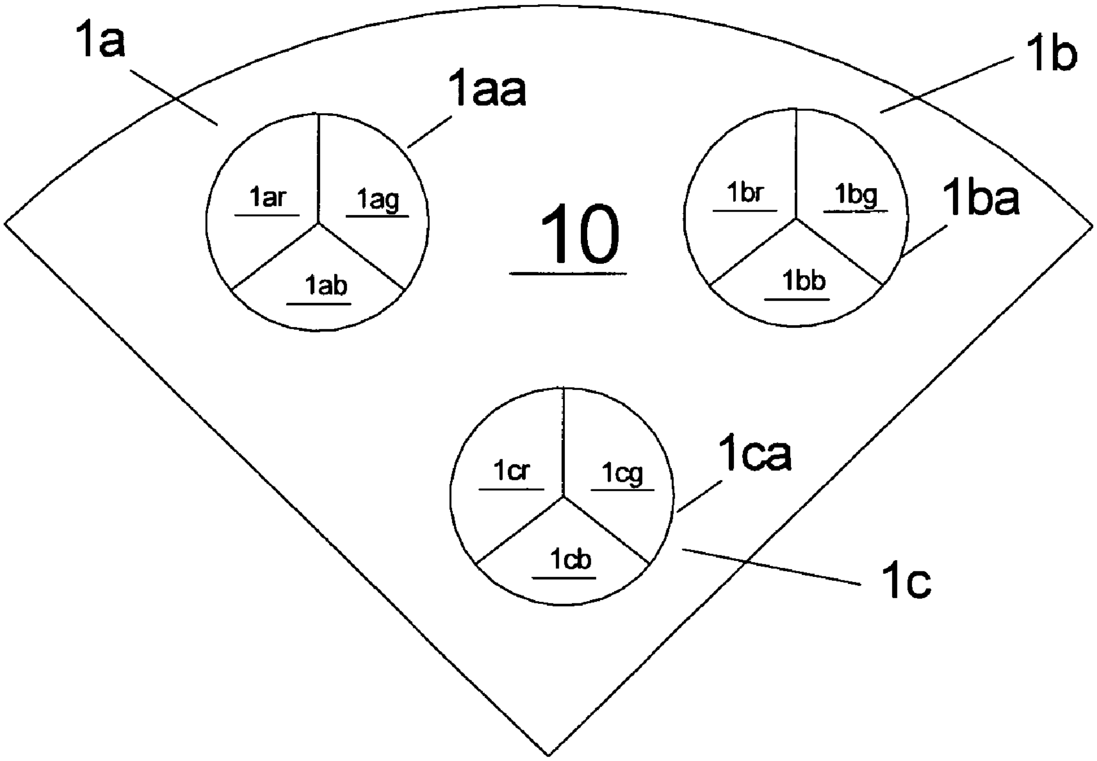
FIG. 2 shows one of the plurality of LED mounting substrates of FIG. 1.

FIG. 2 shows LED emitting circuit board 10 which is the same as LED circuit board 10 of FIG. 1. LEDs 1*a*, 1*b*, and 1*c* are shown in more detail. LED 1*a* is comprised of three separate LED dies 1*ar*, 1*ag* and 1*ab*; and a round aperture 1*aa*. The LED dies 1*ar*, 1*ag*, and 1*ab* are red, green, and blue LED dies, that emit red, green, and blue light, respectively. The LED dies 1*ar*, 1*ag*, and 1*ab* are placed in close proximity to each other within LED 1*a*. The close proximity allows the emitted red, green and blue light from LED dies 1*ar*, 1*ag* and 1*ab*, respectively, to be emitted through the one round output aperture 1*aa*.\

LED 1*b* shown in FIG. 2 is comprised of three separate LED dies 1*br*, 1*bg* and 1*bb*, and a round aperture 1*ba*. The LED dies 1*br*, 1*bg*, and 1*bb* are red, green, and blue LED dies that emit red, green, and blue light, respectively The LED dies 1*br* 1*bg*, and 1*bb* are placed in close proximity to each other within LED 1*b*. The close proximity allows the emitted red, green and blue light from LED dies 1*br*, 1*bg* and 1*bb* respectively to be emitted through one round output aperture 1*ba*.

LED 1*c* shown in FIG. 2 is comprised of three separate LED dies 1*cr*, 1*cg* and 1*cb* and a round aperture 1*ca*. LED dies 1*cr*, 1*cg*, and 1*cb* are red, green, and blue LED dies that emit red, green, and blue light, respectively The LED dies 1*cr*, 1*cg*, and 1*cb* are placed in close proximity to each other within the LED 1*c*. The close proximity allows the emitted red, green and blue light from the LED dies 1*cr*, 1*cg* and 1*cb*, respectively, to be emitted through one round output aperture 1*ca*.

When the LED dies 1*ar*, 1*ag*, and 1*ab* of LED 1*a* are placed in close proximity the red, green and blue light that is emitted by the LED dies 1*ar*, 1*ab* and 1*ag* (respectively) looks substantially blended together to an audience viewer. This provides the audience viewer of a theatrical event with the look of a substantially homogenous color when viewing the combination of light emitted by LED dies 1*ar*, 1*ag* and 1*ab*. For example when the LED dies 1*ar*, 1*ag* and 1*ab*, respectively, emit red, green and blue light, respectively, simultaneously, at an appropriate energy level, the audience viewer views white light emitted by the LED 1*a*. When red and green light are emitted from LED dies 1*ar* and 1*ag*, respectively, and at an appropriate energy level, but no blue light is emitted from LED die 1*ab*, the audience viewer views yellow light emitted by LED 1*a*. It is preferred that the red, green and blue LED dies that comprise each of LEDs 1*a*, 1*b*, 1*c*, 2*a*, 2*b*, 2*c*, 3*a*, 3*b*,

3*c*, 4*a*, 4*b*, and 4*c* of the multiparameter light 100 of FIG. 1 be mounted in close proximity to each other to cause a substantially homogenous color look to an audience viewer. The controlled emission of the red, green and blue light from the red, green and blue LED dies that comprise each of LEDs 1*a*, 1*b*, 1*c*, 2*a*, 2*b*, 2*c*, 3*a*, 3*b*, 3*c*, 4*a*, 4*b*, and 4*c* form an additive color mixing system within each of LEDs 1*a*, 1*b*, 1*c*, 2*a*, 2*b*, 2*c*, 3*a*, 3*b*, 3*c*, 4*a*, 4*b*, and 4*c*. Other colors of LED dies can be used when forming an additive color mixing system such as the color yellow or amber. Alternatively separate LEDs of red, green and blue could be mounted in close proximity to each other to cause a blending of the Red, Green and Blue emitted light, however, in practice it is difficult to locate separate red, green and blue LEDs close enough because of their required packaging.

A commercially available LED with a single output aperture containing red, green and blue LED dies is available from ProLight Opto Technology Corporation (trademarked) of Taiwan, China.

LED emitting circuit boards 20, 30 and 40 of FIG. 1 are constructed similarly to LED emitting circuit boards 10 of FIG. 2. The LEDs 2*a*, 2*b* and 2*c* of LED emitting circuit boards 20 of FIG. 1 are constructed similarly to LED emitting circuit boards 10 of FIG. 2.

The LEDs 3*a*, 3*b* and 3*c* of LED emitting circuit boards 30 of FIG. 1 are constructed similarly to LED emitting circuit boards 10 of FIG. 2. The LEDs 4*a*, 4*b* and 4*c* of LED emitting circuit boards 40 of FIG. 1 are constructed similarly to LED emitting circuit boards 10 of FIG. 2.

Figure 3:
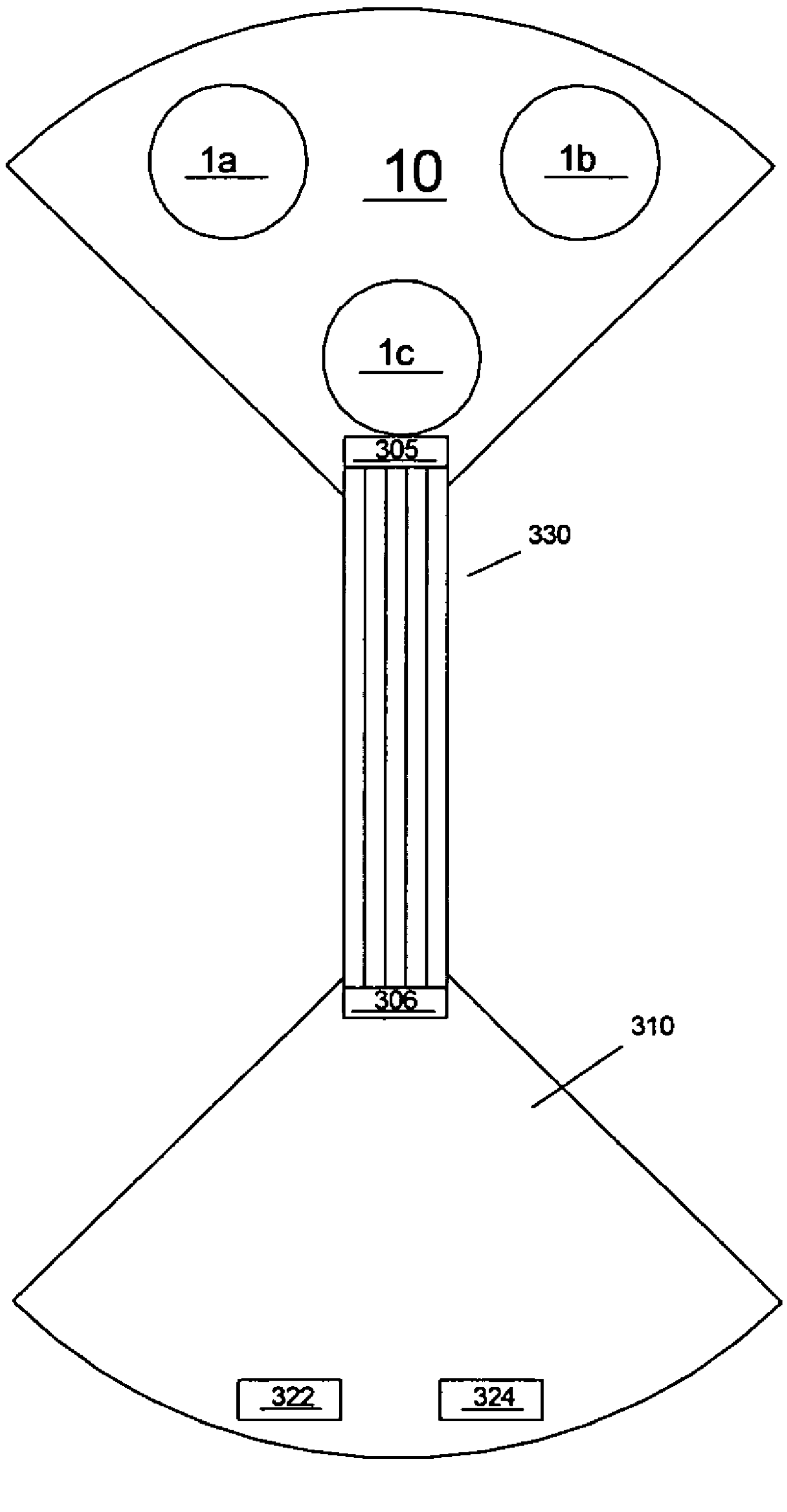
FIG. 3 shows the LED mounting substrate of FIG. 2 interconnected to a an LED drive or signaling circuit board
Figure 6:
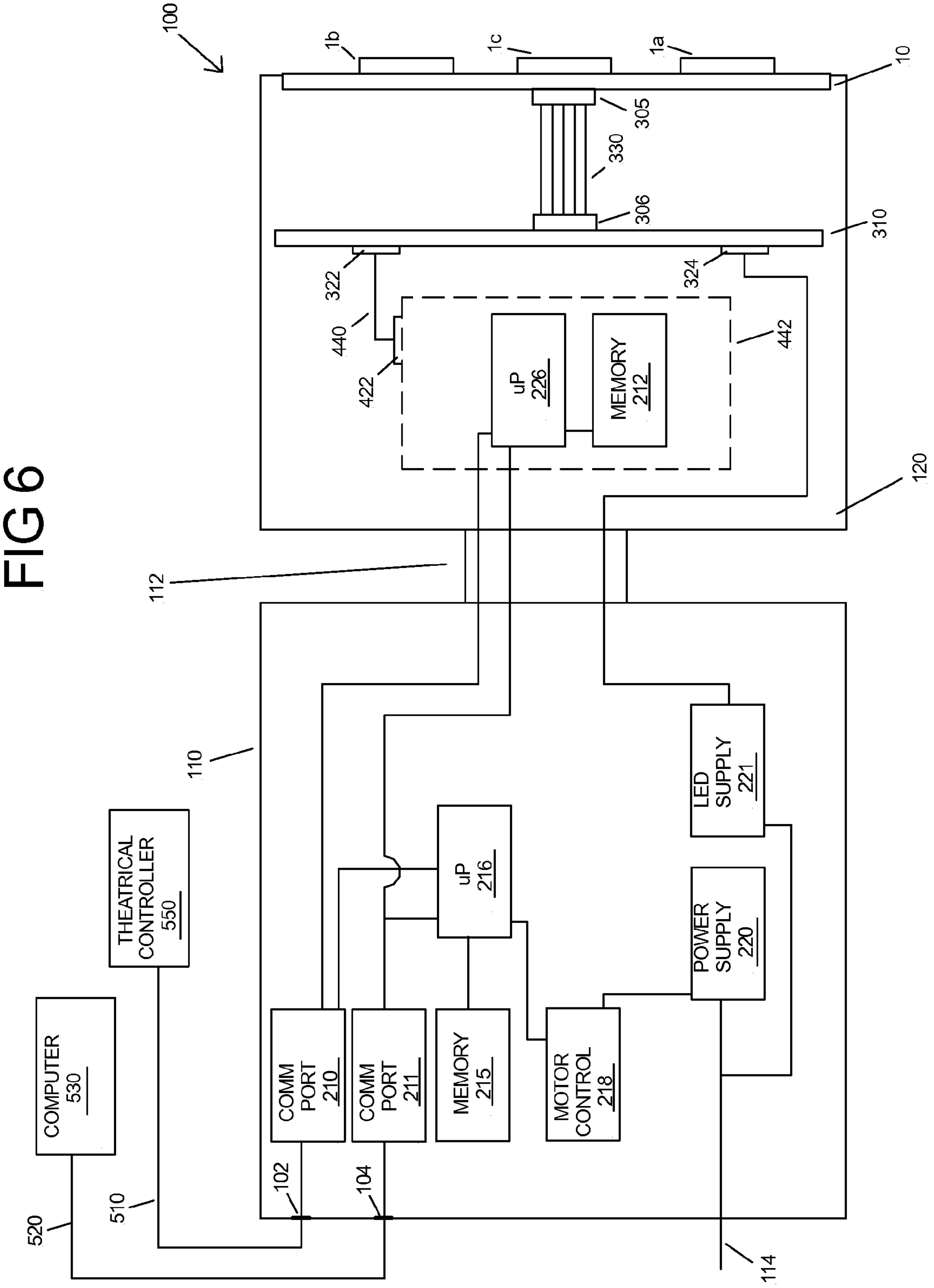
FIG. 6 shows the internal electronic components of the multiparameter light of FIG. 1.

FIG. 3 shows the same LED emitting circuit board 10 of FIG. 2 interconnected by a multi conductor flat cable 330 to an LED signaling circuit board section 310. The LED signaling circuit board 310 provides controlled output current to the LEDs 1*a*, 1*b*, and 1*c*. It has been found that the use of a multi conductor flat cable for cable 330 (also referred to as a ribbon cable) is preferred over other types of multiconductor cables because a multi conductor flat cable has a thin cross-section. The thin cross-section allows the multiconductor flat cable 330 to be placed strategically so as not to block any portion of the emitted light from the LEDs 1*a*, 1*b* and 1*c* and the multiconductor flat cable 330 can be threaded between a small gap in the circuit boards 10, 20, 30 and 40. This is desirable because the circuit boards 10, 20, 30 and 40 would typically be manufactured of a heat conductive material only allowing the electronics connector 305 of FIG. 3 to be fixed on the same side as the LEDs 1*a*, 1*b*, and 1*c*. Further the multiconductor flat cable 330 reduces the footprint area of the electronics connector 305 of FIG. 3 allowing for a higher density of LEDs to be placed on the LED emitting circuit board 10. One such flat cable is manufactured by Molex Electronics (trademarked) of Lisle Ill. The electronics connector 305 is mounted on the LED emitting circuit board 10 and an electronics connector 306 is mounted on the LED signaling board 310. The connectors 305 and 306 facilitate easy application and removal for service of the multi conductor flat cable 330. The LED signaling circuit board 310 has an electronic connector 322 for connecting to a data signal that is provided by a logic board 442 shown in FIG. 6 that contains a micro processor 226 and a memory 212. An additional electronics connector 324, also shown in FIG. 6, is used to connect DC voltage power from a DC power supply 221.

Figure 4:
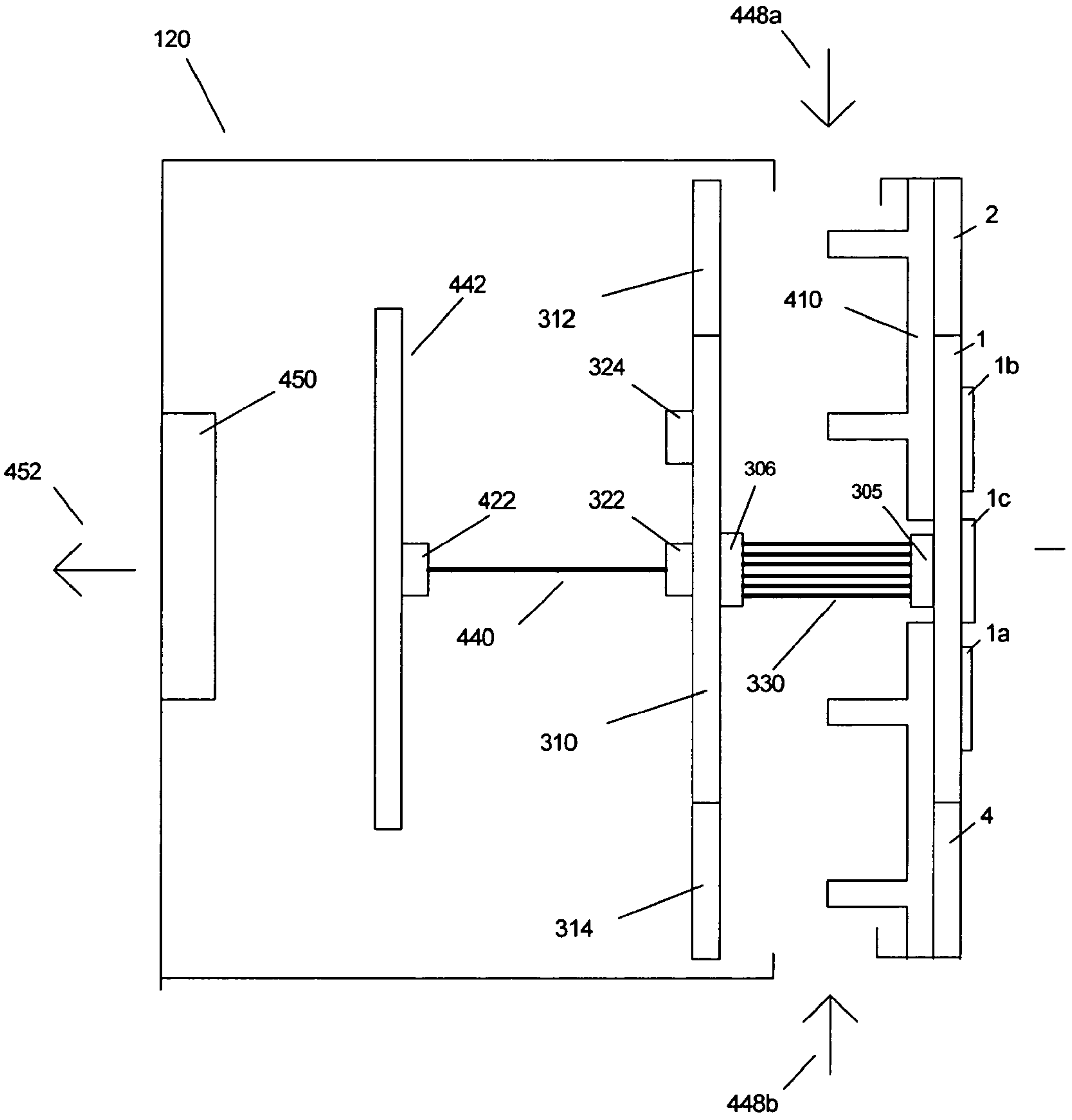
FIG. 4 shows a lamp housing of the multiparameter light of FIG. 1, incorporating the LED drive or signaling circuit board of FIG. 3 and the LED mounting substrate of FIG. 3.

FIG. 4 shows the internal components of the lamp housing 120 of the multiparameter light 100 of FIG. 1. The LED emitting circuit board 10 is shown with the LEDs 1*a*, 1*b* and 1*c* fixed thereto. The multiconductor flat cable 330 connects the electronics connector 305 to the electronics connector 306 of the LED signaling board 310. The LED emitting circuit board 10 and the remaining three LED emitting circuit boards 20, 30 and 40 (not shown for simplification) are fixed to a heat sink 410 to allow removal of heat generated by the LEDs 1*a*, 1*b*, 1*c*, 2*a*, 2*b*, 2*c*, 3*a*, 3*b*, 3*c*, 4*a*, 4*b*, and 4*c*. All LED emitting circuit boards 10, 20, 30 and 40 are fixed to the heat sink 410 of FIG. 4 and the heat sink 410 is a component of the lamp housing 120.

As shown in FIG. 4, a cooling fan 450 pulls air in the direction of arrows 448*a* and 448*b* into the lamp housing 120 in the proximity of the heat sink 410 and exhausts the air through the fan 450 in the direction of arrow 452. For each of the LED emitting circuit boards 10, 20, 30 and 40 of FIG. 1 there is a designated LED signaling board section such as LED signaling board section 310 for LED emitting circuit board 10 of FIG. 4 and there are three additional LED signaling boards (not shown for simplification) that each connect to their own respective LED emitting circuit board of boards 20 30 and 40, of FIG. 1 in a similar fashion. As shown in FIG. 6, the LED signaling board 310 is connected by electronics connector 322 to receive control signals via conductor 440 as supplied by the logic board 442 via electronic connector 422. All LED signaling boards including signaling board 310 and similar signaling boards (not shown for simplification) have their own connectors similar to connector 322 of LED signaling boards 310 for connection to the logic board 442 so control signals can be received by each LED signaling board and then sent to their respective LED emitting circuit board of 10, 20, 30, and 40 LED signaling circuit boards provide the controlled variable power to their respective LED emitting circuit board of 10, 20, 30, and 40 for powering their respective LEDs with variable power.

The use of LED emitting circuit boards with respective LED signaling circuit boards that can be easily connected or unconnected by a multiconductor flat cable allows a service technician to replace only a set of the plurality of LEDs that comprise the multiparameter light 100 of FIG. 1 or the service technician may only replace a portion of the LED signaling system that drives (or powers) the plurality of LEDs. The use of a plurality of physically disconnected or easily separable circuit boards and LED signaling circuit boards reduces the service cost of replacement components for the multiparameter light 100 of FIG. 1.

Figure 5:
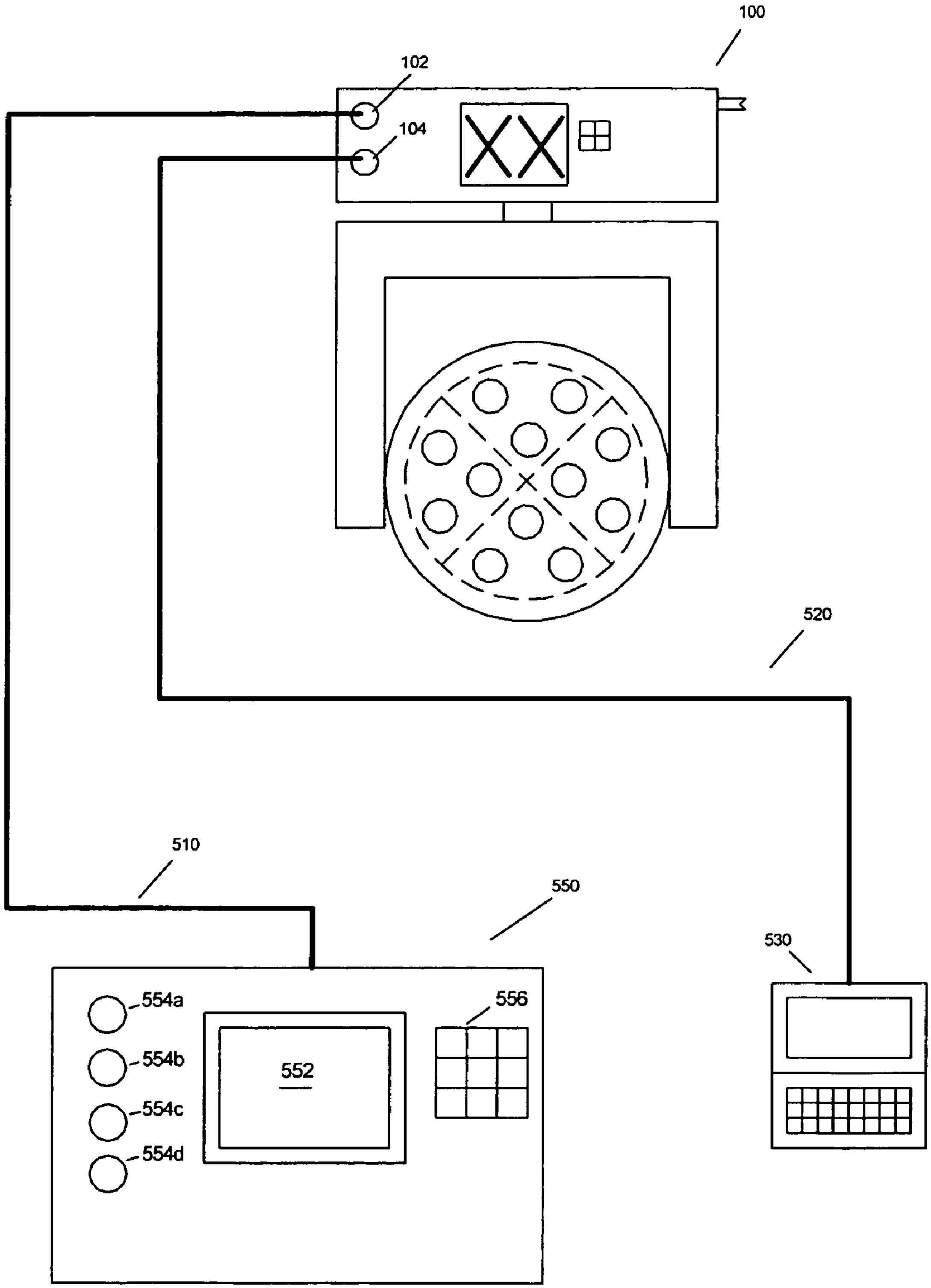
FIG. 5 shows a control system for operation of the multiparameter light of FIG. 1.

FIG. 5 shows the multiparameter light 100 connected to an external control system that comprises a theatrical control console 550 and a personal computer 530. The theatrical control console 550 can communicate commands over a theatrical communication network using the DMX protocol created by the United States Institute of Theatre Technology. The DMX protocol, as known in the art, is comprised of 512 control channels with each channel having 256 selectable values. The theatrical control console (or theatrical controller or central controller) 550 is connected via communication line 510 to communication connector 102 of the multiparameter light 100. The personal computer 530 connects via communication conductor 520 to the communication connector 104 of the multiparameter light 100. Although communications conductors 510 and 520 are shown, wireless transmission of communications may also be used as known in the art.

The theatrical controller 550 of FIG. 5 has a video screen 552, an input entry keypad 556, and input entry devices 554*a*, 554*b*, 554*c*, and 554*d*.

The communications between the personal computer 530 and the multiparameter light 100 can be compliant with the Universal Serial Bus (USB) or Ethernet communication schemes. The communications port 211 of FIG. 6 can be compliant with the Universal Serial Bus (USB) or Ethernet communication scheme. The communications port 210 of FIG. 6 can be compliant with the Electronics Industry Association (EIA) “422” or “485” multipoint communications standard as specified by the DMX protocol.

FIG. 6 shows an internal view of the multiparameter light 100. A first communications port 210 can be compatible with the DMX communications protocol. The theatrical control console 550 is connected to communicate to communications port 210 via the communications connector 102 and the communications line 510. A second communications port 104 can be compatible with USB or Ethernet communications schemes. A personal computer 530 is connected to communicate to communications port 211 via the communications connector 104 and the communications line 520. The communication ports 210 and 211 are connected to communicate commands, operating software and content received from the theatrical control console 550 and the personal computer 530 to the micro processors 216 and 226. Memory 215 contains the operational software that allows the micro processor 216 of the multiparameter light 100 to respond to commands, content and operational software received by the communication ports 210 or 211. Memory 212 contains the operational software that allows the micro processor 226 of the multiparameter light 100 to respond to commands, content and operational software received by the communication ports 210 or 211. Operational software (OS) is the software that dictates the operational characteristics of multiparameter light 100. The logic circuit board 442 is shown within the lamp housing 120 as a dashed line. The logic circuit board 442 contains the memory 212 and the processor 226. The logic circuit board 442 provides a data signal to the LED signaling circuit board 310 via electronic connectors 422 and 322 and the conductor 440. The logic circuit board 442 is also connected to the further plurality of LED signaling circuit boards (not shown for simplicity via similar electronic connectors and conductors). The LED signaling circuit board 310 is connected to the LED emitting circuit board 10 via the connectors 305 and 306 and the multiconductor flat cable 330. LEDs 1*a*, 1*b* and 1*c* are shown fixed to the LED emitting circuit board 10.

Bearing 112 shown in FIG. 6 and FIG. 1 facilitates the remote controlled panning of the lamp housing 210 in relation to the base housing 110 (motor actuators not shown for simplicity). Mains supply 114 is connected to system power supply 220 and LED power supply 221. LED power supply 221 is connected to the LED signaling circuit board 310 (and the remaining LED signaling boards not shown for simplification) to provide the LED emitting circuit board 10 (and the remaining LED emitting circuit boards not show for simplification) with controlled power to operate the LEDs 1*a*, 1*b*, 1*c*, 2*a*, 2*b*, 2*c*, 3*a*, 3*b*, 3*c*, 4*a*, 4*b* and 4*c*.

The motor control circuit 218 provides motor control signals to the motor actuators (not shown for simplification) that remotely position the lamp housing 120, and the yoke 115 in relation to the base housing 110 of FIG. 1.

U.S. Pat. No. 6,357,893 to Belliveau, incorporated by reference herein, discloses that a plurality of LEDs of a multiparameter stage light can be individually controlled, where individually controlled refers to on and off as well as intensity. In accordance with one or more embodiments of the present invention, the multiparameter light 100 of FIG. 1 1 is capable of individually adjusting the intensity of each one of the plurality of LEDs 1*a*, 1*b*, 1*c*, 2*a*, 2*b*, 2*c*, 3*a*, 3*b*, 3*c*, 4*a*, 4*b*, and 4*c*. Furthermore each of the LED dies that make up each of LEDs 1*a*, 1*b*, 1*c*, 2*a*, 2*b*, 2*c*, 3*a*, 3*b*, 3*c*, 4*a*, 4*b*, and 4*c* may have their intensity level (including “on” and “off”) individually adjusted by the multiparameter light 100 of FIG. 1 of the present application. Each of the LEDs 1*a*, 1*b*, 1*c*, 2*a*, 2*b*, 2*c*, 3*a*, 3*b*, 3*c*, 4*a*, 4*b* and 4*c* are constructed of multiple LED dies such as that shown for LED 1*a* of FIG. 2 wherein the LED dies are shown as 1*ar*, 1*ag* and 1*ab*. The LED dies 1*ar*, 1*ag* and 1*ab* are a red LED die, a green LED die and a blue LED die, respectively, but may be other colored LED dies that comprise each of LEDs 1*a*, 1*b*, 1*c*, 2*a*, 2*b*, 2*c*, 3*a*, 3*b*, 3*c*, 4*a*, 4*b* and 4*c* including a yellow or amber LED die.

Multiparameter light 100 of FIG. 1 is shown constructed of twelve LEDs shown as LEDs 1*a*, 1*b*, 1*c*, 2*a*, 2*b*, 2*c*, 3*a*, 3*b*, 3*c*, 4*a*, 4*b* and 4*c*. Each of the twelve LEDs is similarly constructed of a separate red, green and blue LED die. Each of the thirty-six LED dies is individually controllable as to intensity (including “on” and “off”). The means for multiparameter light 100 there are twelve red light emitting LED dies, twelve green light emitting LED dies and twelve blue light emitting LED dies. The multiparameter light 100 of FIG. 1 may collectively adjust the intensity of all LED dies of one color. For example all twelve red light emitting LED dies may have their light output intensity adjusted (including on and off). All twelve green light emitting LED dies may have their light output intensity adjusted (including on and off). All twelve blue light emitting LED dies may have their light output intensity adjusted (including on and off). When all LED dies of one color are illuminated at the same intensity the multiparameter light 100 looks balanced (since all LED dies of one color are illuminated simultaneously at a particular intensity) to an audience viewer. In this mode the multiparameter light 100 can be used in a conventional way that allows an operator of the theatrical control console 550 to produce red, green and blue color washes.

The multiparameter light 100 of FIG. 1 may also adjust each of the plurality of the thirty-six LED dies (by adjusting each LED die that comprises each LED) to be a different intensity level (including “on” and “off”). In this mode each of the plurality of LEDs 1*a*, 1*b*, 1*c*, 2*a*, 2*b*, 2*c*, 3*a*, 3*b*, 3*c*, 4*a*, 4*b* and 4*c* may be set at different intensity level and a different color (using additive color mixing of the red, green and blue). It is preferred that each LED die such as LED dies 1*ar*, 1*ag* and 1*ab* have their intensity individually controlled with a minimum of two hundred and fifty-eight separate levels of intensity including one of the levels as off and one level as fully on. The fewer the number of intensity levels the easier it is for the audience viewer to see the change from one intensity level to the next intensity level. The more intensity levels the smoother the transition between one adjacent intensity level to the next.

Since the multiparameter light 100 of FIG. 1 may control the 36 LED RGB dies each at a different intensity level (including “on” and “off”) it can be seen that over nine thousand intensity levels can be adjusted and in many combinations. An operator of the theatrical control console 550 would find adjustment of the nine thousand intensity levels quite burdensome when trying to create a visual multicolor graphic display from the multiparameter light 100 of FIG. 1. Furthermore many theatrical shows will use a plurality of multiparameter lights, similar or identical to the multiparameter light 100 of FIG. 1 in a system making the work of the operator of the theatrical control console 550 even more burdensome. It has been found by the inventors that pre-storing graphical content within the memory 226 of FIG. 6 simplifies the work of an operator of the theatrical control console 550. The multiparameter light 100 of FIG. 1 may store over one hundred different graphical content programs (GCPs). Each GCP stored in the memory 226 of FIG. 6 is capable of providing intensity information (including “on” and “off”) for each of the thirty-six separate LED dies. A GCP may also have several frames of information for each of the thirty-six separate LED dies. Each frame may provide separate intensity information (including "on" and "off") for each of the thirty-six LED dies. One GCP may have 2 or more frames of information used to control each of the thirty-six LED dies. The creation of just one GCP can be time consuming to a person creating the GCP. The inventors of the multiparameter light 100 of FIG. 1 have found that the theatrical control console 550 is not well suited for the creation of GCPs.

The inventors have found that computer graphics formats that have been designed to create graphics on a personal computer provide a greater efficiency when creating a GCP for the multiparameter light 100 of FIG. 1 especially when the GCP contains multiple frames of graphical content. One such graphics format that is preferred to create a GCP for the multiparameter light 100 of FIG. 1 is the Graphics Interchange Format (GIF) that was introduced by CompuServe (trademarked) of Columbus Ohio.

An operator of a personal computer can use a commercially available graphics creation program to create a GIF file for the multiparameter light 100 such an Adobe Flash (trademarked) manufactured by Adobe Systems (trademarked) Incorporated of San Jose Calif. A graphic mask can be created within Adobe Flash (trademarked) that allows a representation of the twelve LEDs 1*a*, 1*b*, 1*c*, 2*a*, 2*b*, 2*c*, 3*a*, 3*b*, 3*c*, 4*a*, 4*b*, and 4*c* and the intensity level (including "on and "off") of each red, green and blue LED dies that comprise the LEDs 1*a*, 1*b*, 1*c*, 2*a*, 2*b*, 2*c*, 3*a*, 3*b*, 3*c*, 4*a*, 4*b*, and 4*c*. Many frames of graphical information that represent the intensity levels of LEDs 1*a*, 1*b*, 1*c*, 2*a*, 2*b*, 2*c*, 3*a*, 3*b*, 3*c*, 4*a*, 4*b*, and 4*c* and their respective red, green and blue LED dies can be constructed by an operator of the Adobe Flash (trademarked) program to create a GIF file. The many frames of graphical information are used to create a visual animation as the frames are displayed by the LEDs 1*a*, 1*b*, 1*c*, 2*a*, 2*b*, 2*c*, 3*a*, 3*b*, 3*c*, 4*a*, 4*b*, and 4*c*. The GIF file created by Adobe Flash (trademarked) is stored on a personal computer such as personal computer 530 of FIG. 5.

In the preferred version a GIF file is used to create a GCP. However other computer graphics formats including but not limited to BMP, JPG and TIF, may be used to create a GCP. It is also possible to use video file formats including but not limited to MPEG and MJPEG to create a GCP.

When using a graphics format file or a video format file to create a GCP, many times the amount of pixel information that is contained in the graphics file is far greater than that required to operate the plurality of LEDs 1*a*, 1*b*, 1*c*, 2*a*, 2*b*, 2*c*, 3*a*, 3*b*, 3*c*, 4*a*, 4*b*, and 4*c* of multiparameter light 100 of FIG. 1. Graphics files and video files may contain thousand or even millions of pixels that have their respective intensity and color information contained within. Since the multiparameter light 100 of FIG. 1 only is shown with twelve LEDs 1*a*, 1*b*, 1*c*, 2*a*, 2*b*, 2*c*, 3*a*, 3*b*, 3*c*, 4*a*, 4*b*, and 4*c* and each LED is made up of a red emitting die, a green emitting die, and a blue emitting die and there are only twelve RBG LEDs to be controlled by the graphics file used to create the GCP. The storage of unnecessary pixel information in a GCP at the memory 212 or memory 215 is therefore a waste of memory space and cost. It has been found to be an advantage for the computer 530 of FIG. 6 to operate a conversion program that strips a graphics file or video file of unnecessary pixel information when creating a GCP. The inventors have envisioned the need to create a computer software program that strips larger graphics or video files created by a graphic creation program of unwanted pixel information and prepares a more efficient GCP. The more efficient GCP created by the conversion computer program then contains a subset of the required data to operate the LEDs thus reducing any unnecessary data that has to be stored in the memory 215 or 212 of FIG. 6. A commercially available graphics creation computer program and a conversion computer program that strips the graphics file of unnecessary pixels can both operate on the personal computer 530 of FIG. 6.

It is also possible to directly store any of a GIF, BMP, JPG, TIF of other graphics format directly in the memory 212 or memory 215 as a GCP. Even video formats such as MPEG or MJPEG of other video file formats can be stored in the memory 212 or the memory 215 of FIG. 6. However, the storage of graphics formats and video formats without stripping unnecessary pixels that will not be required for the operation of the plurality of LEDs 1*a*, 1*b*, 1*c*, 2*a*, 2*b*, 2*c*, 3*a*, 3*b*, 3*c*, 4*a*, 4*b*, and 4*c* tends to waste memory space.

The multiparameter light 100 of FIG. 1 can contain hundreds of GCPs in the memory 212 or memory 215. When the multiparameter light 100 is produced at the factory it is an advantage to produce the product with a plurality of stock factory GCPs (called "stock content"). In this way an operator of the multiparameter light 100 will be able to produce graphic light output from the stock factory GCPs without having to create a custom GCP. One sector of memory in the memory 212 or memory 215 of FIG. 6 is used to store the factory GCPs (stock content). A second sector of memory in the memory 212 or memory 215 is used to store GCPs that have been created by an operator of the multiparameter light 100 of FIG. 1 (called "user content") if the need should arise.

In practice, an operator of the multiparameter light 100 of the invention can create a desired graphic in a GIF format using a commercially available graphics creation program such as Adobe Flash on the personal computer 530 of FIG. 6. The personal computer 530 of FIG. 6 can then operate a conversion program to strip the unnecessary pixel information from the created GIF that is not required to operate the LEDs 1*a*, 1*b*, 1*c*, 2*a*, 2*b*, 2*c*, 3*a*, 3*b*, 3*c*, 4*a*, 4*b*, and 4*c*. The stripped GIF GCP is then ready to be uploaded to the memory 215 of 216 of FIG. 6. A GCP may be a graphics file that was large and therefore stripped to remove the excess pixel information or a GCP may be the direct graphics file without stripping. The operator then instructs the personal computer 530 to communicate and upload the GCP via communication line 520, connector 104 and communication port 211. The processor 216 or 226 receives the uploaded GCP data from the communication port 211 and commits the GCP data to the memory 215 or the memory 212 using operational code stored in the memory 215 or 212. The GCP data sent by the personal computer 530 of FIG. 6 may be sent compliant with the computer industry communications protocol of the Universal Serial Bus (USB) or Ethernet.

It is also possible for the operator to create a GCP using input devices 554*a*, 554*b*, 554*c*, 554*d*, or keypad entry device 556 shown in FIG. 5, or for an operator to load already created GCP data into the theatrical controller 550 by using a compact disk or other memory storage device. The operator may then input commands using the input devices 554*a*, 554*b*, 554*c* or 554*d* or keypad entry device 556 to transfer the GCP data via communication line 510 and input connector 102 to the communications port 210 of FIG. 6. The micro processor 216 or 226 using the operational code stored in the memory 215 or 212 respectively transfers the upload data of the GCP sent by the theatrical controller 550 of FIG. 6 to the memory 215 or 212. The GCP data sent by the theatrical controller 550 of FIG. 6 may be sent compliant with the Electronic Industries Alliance (EIA) "422 or "485" multipoint communications standard as specified by the DMX protocol.

During a theatrical event an operator of the theatrical controller 550 of FIG. 6 may send commands over the communications line 510 that are compliant with the DMX protocol.

The operator of the theatrical controller 550 may input commands by using the input entry devices 554*a*, 554*b*, 554*c* and 554*d* or the keypad entry device 556 of FIG. 5. The operator may send a command to pan or tilt the lamp housing 120 of FIG. 1 in relation to the base housing 110. A pan or tilt command sent by the theatrical controller 550 is received by the communications port 102 and processed by the micro processor 216 using the operational code stored in the memory 215. The micro processor 216 sends the appropriate control signals to the motor control circuit 218. The motor control circuit 218 sends the appropriated motor control signals to the pan and tilt motors (not show for simplicity) that can remotely position the lamp housing 120 in relation to the yoke 115 and the lamp housing 120 in relation to the base housing 110. This allows the operator to remotely position the lamp housing 120 containing the plurality of LEDs in relation to the base housing 110 so as to point the lamp housing 120 at the audience or at an entertainer on the stage if desired. Pointing the lamp housing's LED illuminated graphic display at an audience can provide an exciting graphic visual to the audience. Next the operator of the theatrical controller 550 may command the multiparameter light 100 of FIG. 1 to output graphical light as determined by a first GCP of a plurality of GCPs stored in the memory 212. The micro processor 226 acts in conjunction with the operational software also stored in the memory 215 or 226 to send control signals derived from the stored GCP data from the logic board 442. The logic board 442 sends the GCP control signals via conductor 440 through connectors 422 to LED signaling board connector 322 of LED signaling board 310. The LED signaling board 310 sends power control signals to the LED emitting board 10 via connectors 305 and 306 and flat conductor 330. The LED emitting board 10 comprises the LEDs 1*a*, 1*b* and 1*c* shown in FIG. 4. The LED emitting board 10 responds by varying the illumination of the LEDs 1*a*, 1*b* and 1*c* as required in response to the GCP. The four LED emitting boards 10, 20, 30 and 40 of FIG. 1 each are connected similarly to four respective LED signaling boards (all boards not shown for simplicity). All LED signaling boards are each connected similarly to their respective LED emitting boards in the way that LED signaling board 310 is connected to LED emitting board 10.

The operator by inputting to the theatrical control console 550 may command the multiparameter light 100 to call up a selected first one of a plurality of GCPs from the memory 215 or 212 of FIG. 6. The operator of the theatrical control console 550 may command the multiparameter light's plurality of LEDs to illuminate in response to the selected first GCP. The selected first GCP may be comprised of a plurality of frames. An audience viewing the multiparameter light 100 of FIG. 1 will visualize multicolored graphical lighting patterns created by the plurality of LEDs that were created by the first GCP stored in the memory of the multiparameter light 100. Some of the GCPs stored in the memory of the multiparameter light 100 of FIG. 6 are created by the factory (referred to as "stock content") and some of the GCPs are created by an operator using a commercial graphics creation program (referred to as "user content"). The operational code stored in the memory 215 or 212 does not allow the operator to easily edit or change any of the stock content GCPs thus preserving that any multiparameter light similar to identical to 100 operated by the operator will have its stock content preserved.

A GCP can be a single frame of information that dictates how the LEDs 1*a*, 1*b*, 1*c*, 2*a*, 2*b*, 2*c*, 3*a*, 3*b*, 3*c*, 4*a*, 4*b*, and 4*c* are illuminated such as what color (by using additive color mixing of the red, green and blue dies of each LED) and at what intensity (including off and on) for any and each LED. A GCP can be multiple frames of information used to create a graphical animation as the illumination and colors of the LEDs 1*a*, 1*b*, 1*c*, 2*a*, 2*b*, 2*c*, 3*a*, 3*b*, 3*c*, 4*a*, 4*b*, and 4*c* are varied between frames.

A plurality of GCPs are stored in the memory 215 or 216 of FIG. 6. A first one of the GCPs stored in the memory 215 of 216 can be selected by an operator of the theatrical control console 550 of FIG. 6 by inputting a command by using the appropriate input devices of 554*a*, 554*b*, 554*c* 554*d* and or 556. The command is sent over a communication system which comprises communications line 510, and the communication connector 102 of the multiparameter light of the invention 100. The command to evoke the selected GCP is received by the communications port 210 and processed by the microprocessor 226 in conjunction with operational code stored in the memory 212. Next the processor 226 acting on the operational code extracts the selected first GCP stored in the memory 212 and sends data control signals to the one or more LED signaling circuit boards such as board 310 of FIG. 6. LED signaling circuit board 310 sends the LED power signals to its appropriate LED emitting board 10 via flat cable 330 and flat cable connectors 306 and 305 of FIG. 6. The LEDs of LED emitting board 10 and other LED emitting boards 20, 30 and 40 may emit the appropriate intensity and color that emulates the first GCP.

Figure 7:
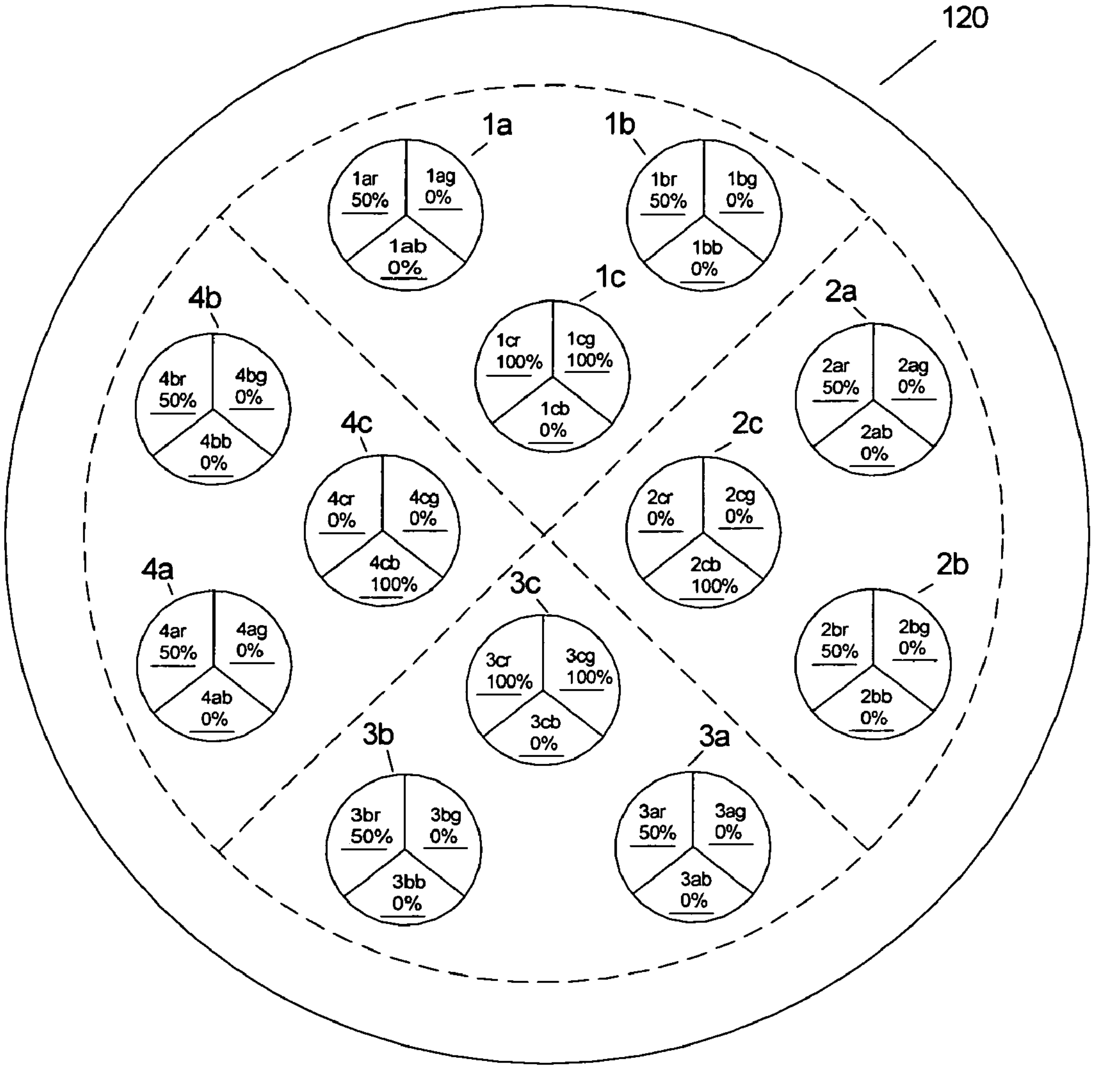
FIG. 7 shows the resultant illumination of a plurality of LEDs of the multiparameter light of FIG. 1 when the multiparameter light responds to a first frame of a first graphical content program of data stored in a memory of FIG. 6.

As mentioned, a GCP may contain only a single frame or multiple frames of information that can provide intensity and color information to control the emission of the LEDs 1*a*, 1*b*, 1*c*, 2*a*, 2*b*, 2*c*, 3*a*, 3*b*, 3*c*, 4*a*, 4*b*, and 4*c*. FIG. 7 shows the resultant illumination of the LEDs 1*a*, 1*b*, 1*c*, 2*a*, 2*b*, 2*c*, 3*a*, 3*b*, 3*c*, 4*a*, 4*b*, and 4*c* when the multiparameter light 100 responds to a first frame of a first GCP of data stored in the memory 226 of FIG. 6.

First GCP, Frame 1
LED 1*a*
1*ar* (red LED die) 50% illumination
1*ag* (green LED die) 0% illumination
1*ab* (blue LED die) 0% illumination
LED 1*b*
1*br* (red LED die) 50% illumination
1*bg* (green LED die) 0% illumination
1*bb* (blue LED die) 0% illumination
LED 1*c*
1*cr* (red LED die) 100% illumination
1*cg* (green LED die) 100% illumination
1*cb* (blue LED die) 0% illumination
LED 2*a*
2*ar* (red LED die) 50% illumination
2*ag* (green LED die) 0% illumination
2*ab* (blue LED die) 0% illumination
LED 2*b*
2*br* (red LED die) 50% illumination
2*bg* (green LED die) 0% illumination
2*bb* (blue LED die) 0% illumination
LED 2*c*
2*cr* (red LED die) 0% illumination
2*cg* (green LED die) 0% illumination
2*cb* (blue LED die) 100% illumination
LED 3*a*
3*ar* (red LED die) 50% illumination
3*ag* (green LED die) 0% illumination
3*ab* (blue LED die) 0% illumination
LED 3*b*
3*br* (red LED die) 50% illumination
3*bg* (green LED die) 0% illumination
3*bb* (blue LED die) 0% illumination LED 3*c*

3*cr* (red LED die) 100% illumination

3*cg* (green LED die) 100% illumination

3*cb* (blue LED die) 0% illumination

LED 4*a*

4*ar* (red LED die) 50% illumination

4*ag* (green LED die) 0% illumination

4*ab* (blue LED die) 0% illumination

LED 4*b*

4*br* (red LED die) 50% illumination

4*bg* (green LED die) 0% illumination

4*bb* (blue LED die) 0% illumination

LED 4*c*

4*cr* (red LED die) 0% illumination

4*cg* (green LED die) 0% illumination

4*cb* (blue LED die) 100% illumination

Figure 8:
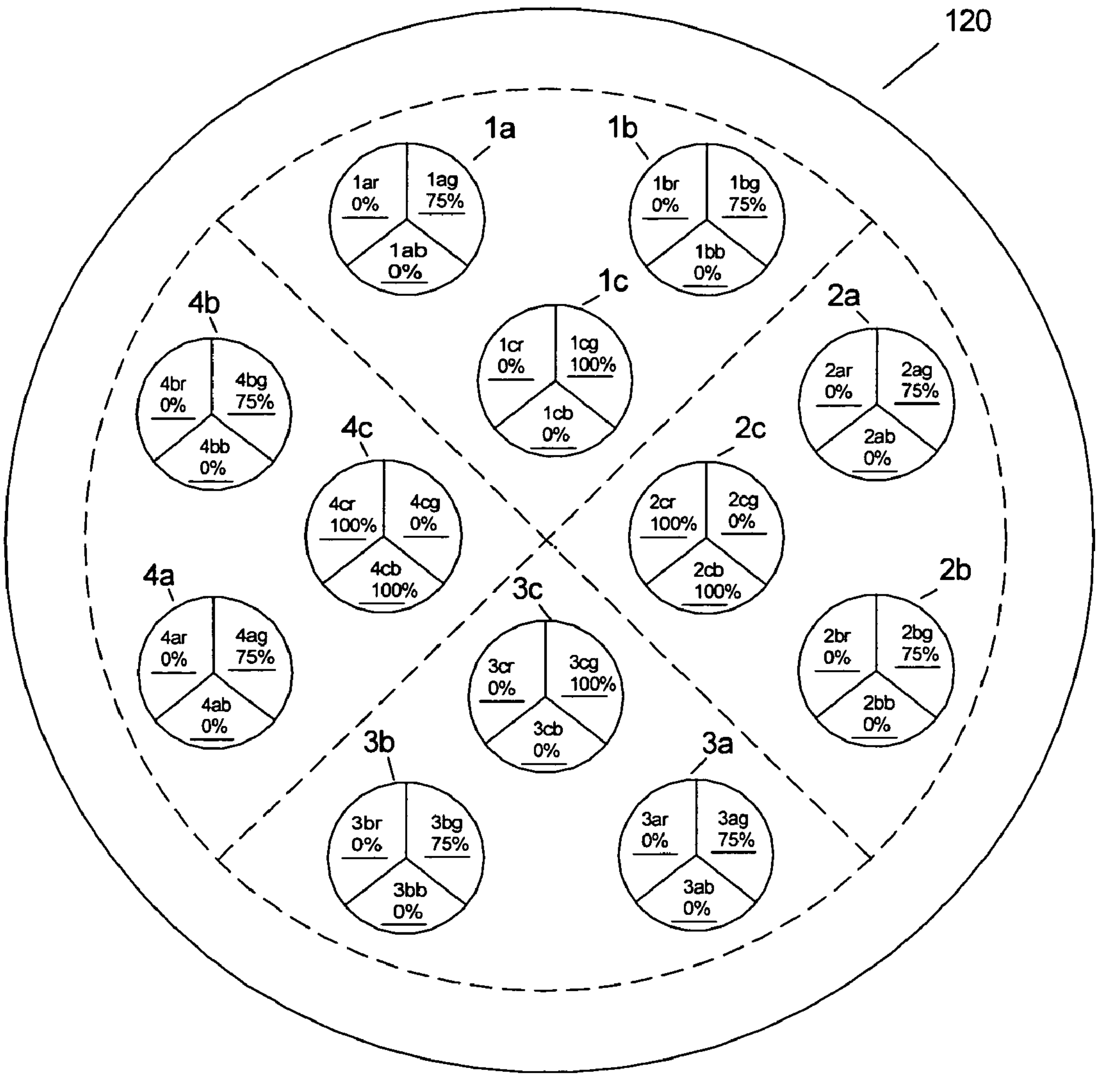
FIG. 8 shows a resultant illumination of the plurality of LEDs of the multiparameter light of FIG. 1 when the multiparameter light responds to a second frame of data for the first graphical content program of data stored in the memory of FIG. 6.

FIG. 8 shows the resultant illumination of the LEDs 1*a*, 1*b*, 1*c*, 2*a*, 2*b*, 2*c*, 3*a*, 3*b*, 3*c*, 4*a*, 4*b*, and 4*c* when the multiparameter light 100 responds to a second frame of data for the first GCP, the second frame of data stored in the memory 226 of FIG. 6.

First GCP, Second frame

LED 1*a*

1*ar* (red LED die) 0% illumination

1*ag* (green LED die) 75% illumination

1*ab* (blue LED die) 0% illumination

LED 1*b*

1*br* (red LED die) 0% illumination

1*bg* (green LED die) 75% illumination

1*bb* (blue LED die) 0% illumination

LED 1*c*

1*cr* (red LED die) 0% illumination

1*cg* (green LED die) 100% illumination

1*cb* (blue LED die) 0% illumination

LED 2*a*

2*ar* (red LED die) 0% illumination

2*ag* (green LED die) 75 illumination

2*ab* (blue LED die) 0% illumination

LED 2*b*

2*br* (red LED die) 0% illumination

2*bg* (green LED die) 75 illumination

2*bb* (blue LED die) 0% illumination

LED 2*c*

2*cr* (red LED die) 100 illumination

2*cg* (green LED die) 0% illumination

2*cb* (blue LED die) 100% illumination

LED 3*a*

3*ar* (red LED die) 0% illumination

3*ag* (green LED die) 75% illumination

3*ab* (blue LED die) 0% illumination

LED 3*b*

3*br* (red LED die) 0% illumination

3*bg* (green LED die) 75% illumination

3*bb* (blue LED die) 0% illumination

LED 3*c*

3*cr* (red LED die) 0% illumination

3*cg* (green LED die) 100% illumination

3*cb* (blue LED die) 0% illumination

LED 4*a*

4*ar* (red LED die) 0% illumination

4*ag* (green LED die) 75% illumination

4*ab* (blue LED die) 0% illumination

LED 4*b*

4*br* (red LED die) 0% illumination

4*bg* (green LED die) 75% illumination

4*bb* (blue LED die) 0% illumination

LED 4*c*

4*cr* (red LED die) 100% illumination

4*cg* (green LED die) 0% illumination

4*cb* (blue LED die) 100% illumination

Although FIG. 7 and FIG. 8 show the resultant illumination of two frames of illumination for a first GCP many GCPs may contain more than two frames of data that can provide a colored animation of the projected light emitted by LEDs 1*a*, 1*b*, 1*c*, 2*a*, 2*b*, 2*c*, 3*a*, 3*b*, 3*c*, 4*a*, 4*b*, and 4*c* from the multiparameter light 100 of FIG. 1.

The "stock content" and the "user content" stored in the memory 212 of the multiparameter light 100 can be individually accessed and evoked by the operator of the theatrical control system 550 of FIG. 6. A first command initiated by the operator of the theatrical control system 550 by using any of the appropriate input devices 554*a*, 554*b*, 554*c*, 554*d* and 556 can select to evoke one of a plurality of stock content GCPs. A second command initiated by the operator of the theatrical control system 550 by using any of the appropriate input devices 554*a*, 554*b*, 554*c*, 554*d* and 556 can select to evoke one of a plurality of user content GCPs. The theatrical control system 550 of FIG. 6 may communicate commands to the multiparameter light 100 of FIG. 1. A first designated DMX channel may provide a selection of up two 256 "stock content" GCPs. A second designated DMX channel may provide selection of up to 256 "user content" channels. It is preferred that the stock content and the user content each utilize a separate DMX channel.

An operator of the theatrical controller 550 of FIG. 5 can use the first designated DMX channel to call up a first animated GCP. The GCP can be an animated GCP that is comprised of a plurality of frames that make up the animation. The frames of a GCP that are used to present an animation are stored in the memory 212. The memory 212 passes the stored frame information of the first animated GCP to the processor 226 that in turn passes each animation frame sequentially to the LED signaling boards such as LED signaling board 310. The LED signaling boards such as LED signaling board 310 provides controlled variable power to their respective LED emitting circuit boards such as LED emitting circuit boards 10, 20, 30, and 40 of FIG. 1 for powering their respective LEDs with variable power to visually create the animation on a frame by frame basis.

The controlled selecting of one animated GCP to another animated GCP by the operator of the theatrical controller 550 when adjusting the first DMX channel results in generating a pleasing light display by the multiparameter light 100. It has been found however that an improvement to the interaction between the music or events on the stage can further be had by allowing the operator of the theatrical controller 550 to individually select a frame of a animated GCP by varying an input device such as input device 554*a*, 554*b*, 554*c* or 554*d* of the theatrical controller 550. The input devices 554*a*, 554*b*, 554*c* and 554*d* can be rotary input devices such as rotary optical encoders or it is preferred that the input devices 554*a*, 554*b*, 554*c* and 554*d* be sliding potentiometers or linear encoders. The varying of the input device such as input device 554*a* causes the DMX values of a second DMX channel to be varied and sent from the theatrical controller 550 and received at the communications port 210 of the multiparameter light 100. The use of a sliding potentiometer for input device 554*a* allows the operator of the theatrical controller 550 to quickly use the hand to go from one frame to another frame of a plurality of frames of a selected GCP live and in fast response to music or other actions on the stage. The selected GCP animation by way of example may be an animation of lips that open and close and use eight frames to create the animation.

The operator using an input device of the theatrical controller 550 such as input device 554*a* can open and close the lips by selecting which one of the eight frames of the selected animation are to be displayed by the multiparameter light 100 in response to music or other actions on the stage during a performance.

Figure 9A:
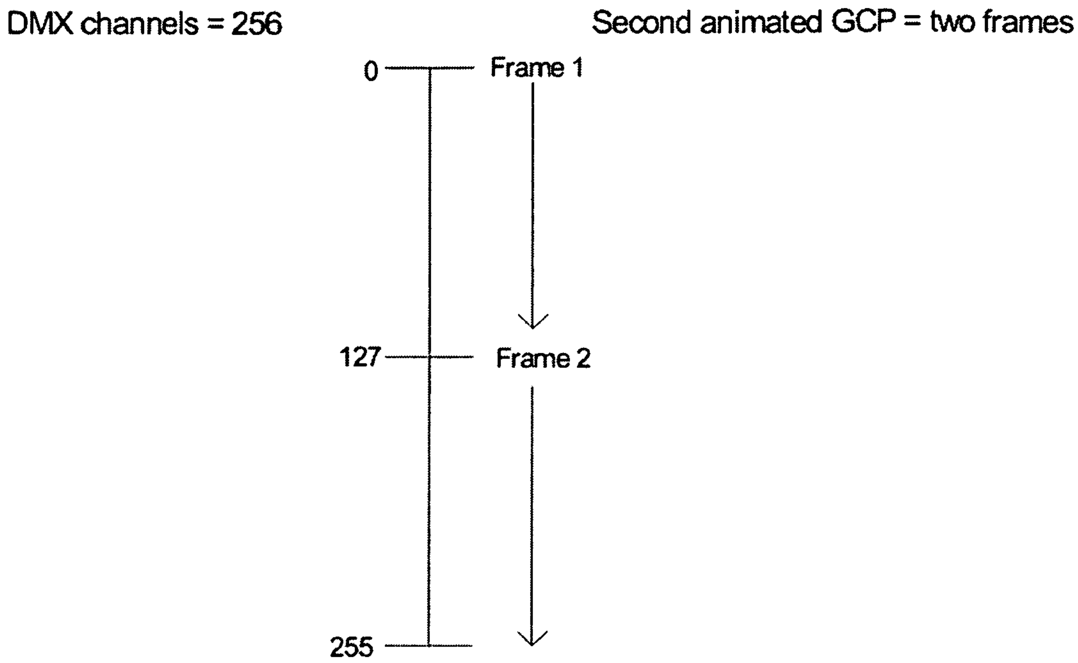
FIG. 9A shows a GCP having two frames of animation that has been scaled to a DMX control channel having two hundred fifty-six values.

Because a DMX channel under the DMX protocol is equipped with 256 discrete values it has been found that scaling the frames of a GCP to the 256 discrete DMX values of the second DMX channel produces the best result for live control of the frames of an animated GCP. The scaling of any selected GCP to the 256 discrete DMX values of the second DMX channel transmitted by the theatrical controller 550 and received by the multiparameter light 100 is accomplished by the operating software stored in the memory 215 or 212 of the multiparameter light 100. A GCP may only have one frame and thus not be animated or a GCP may have hundreds of frames. FIG. 9A shows a second GCP having two frames of animation that has been scaled to the second DMX control channel having two hundred and fifty-six values (0-255). Frame one of the second GCP is scaled to DMX values 0 through 126. Frame two of the second GCP is scaled to DMX values 127 through 255. In this way an input device such as input device 554*a* of theatrical controller 550 that is an input slider operating to select DMX values 0-255 of the second DMX channel can select frame one of the second GCP when the input slider 554*a* is located in any position that causes a DMX value of 0 through 126. A sliding input device is known in the art and an example of a sliding input device is manufactured by Alps Electronic Co. (trademarked) LTD. of Tokyo, Japan. Slider input device 554*a* when positioned to produce DMX values 127 through 255 causes the selection of frame 2 of the second GCP. Scaling the second GCP to the second DMX channel values can be referred to as substantially scaling the frames of the second GCP in relation to the range of the second DMX channel values. This means that the majority of the DMX channel range is associated with frames of the GCP. In this way as the full or majority range of the physical movement of input device 554*a* required to scan from 0 to 255 DMX values can cause all or the majority of the frames of the GCP to be referenced.

Figure 9B:
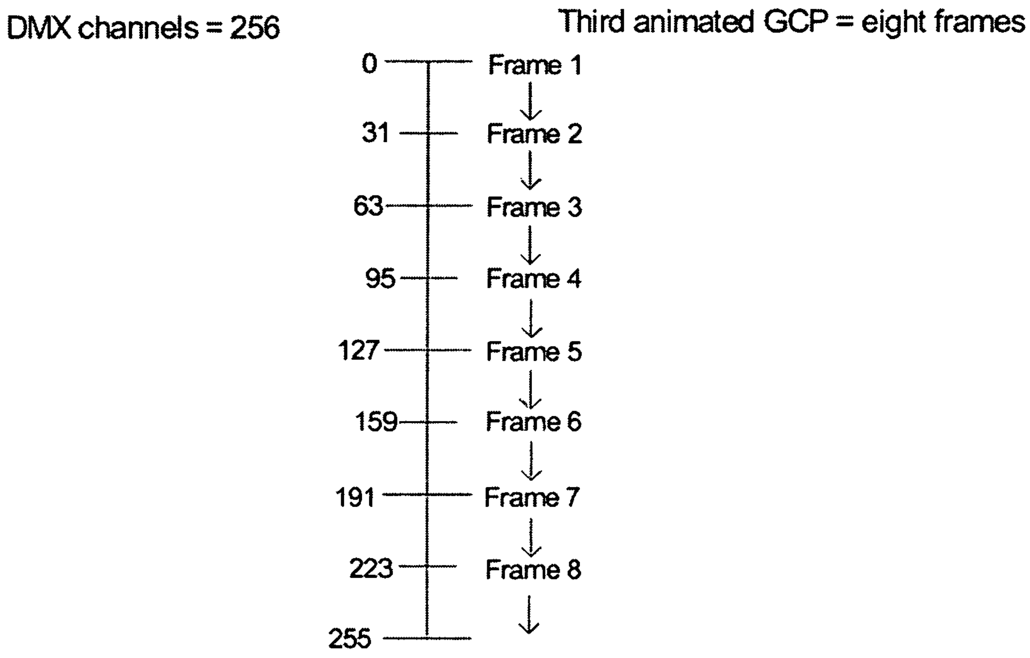
FIG. 9B shows a GCP with eight frames of animation.

FIG. 9B shows a third GCP with eight frames of animation. Again the DMX channel under the standard has two hundred and fifty-six discrete values. The third GCP has its eight frames mapped by the operating system stored in the memory 215 or 212 of FIG. 6 by scaling the eight frames of the third GCP to the DMX channels two hundred and fifty-six discrete values.

We claim:

1. A stage lighting apparatus comprising:
a communications port;
a processor;
a memory;
a lamp housing;
a base housing; and
a plurality of light emitting diodes including a first light emitting diode including a first color, a second light emitting diode including a second color, and a third light emitting diode including a third color, wherein the first color, the second color and the third color are different from each other;
wherein the lamp housing is remotely positionable in relation to the base housing;
wherein a plurality of graphical content programs, each comprised of a plurality of frames of data, are stored in the memory; and wherein the processor is programmed to select a first frame of data of a plurality of frames of data of a first graphical content program of the plurality of graphical content programs if a first DMX value supplied by an operator of a theatrical control system on a first DMX channel is within a first range of DMX values, and the processor is programmed to use the first frame of data to cause:
the first light emitting diode to be illuminated to a first percent illumination;
the second light emitting diode to be illuminated to a second percent illumination; and
the third light emitting diode to be illuminated to a third percent illumination;
wherein the first percent illumination, the second percent illumination, and the third percent illumination are different from each other; and
wherein the processor is programmed to select a second frame of data of the plurality of frames of data of the first graphical content program of the plurality of graphical content programs if the first DMX value supplied by the operator of the theatrical control system on the first DMX channel is within a second range of DMX values, wherein the first range is different from the second range, the second frame of data is different from the first frame of data, and the processor is programmed to use the second frame of data to cause:
the first LED to be illuminated to a fourth percent illumination;
the second LED to be illuminated to a fifth percent illumination; and
a third light emitting diode to be illuminated to a sixth percent illumination; and
wherein the fourth percent illumination, the fifth percent illumination, and the sixth percent illumination are different from each other.

2. The stage lighting apparatus of claim 1 wherein
the first range of DMX values and the second range of DMX values together make up all the possible DMX values for the first DMX channel.

3. The stage lighting apparatus of claim 2 wherein
there is no overlap between the first range of DMX values and the second range of DMX values.

4. The stage lighting apparatus of claim 1 wherein
the first DMX value is supplied by the operator by use of an input device.

5. The stage lighting apparatus of claim 4 wherein the input device is a slider.

6. A method of operating a stage lighting apparatus comprising:
remotely positioning a lamp housing of the stage lighting apparatus in relation to a base housing of the stage lighting apparatus, wherein the lamp housing includes therein a plurality of light emitting diodes, which include a first light emitting diode including a first color, a second light emitting diode including a second color, and a third light emitting diode including a third color, wherein the first color, the second color, and the third color are different;
storing a plurality of graphical content programs in a memory of the stage lighting apparatus;
receiving at a processor, a first DMX value on a first DMX channel from an operator of a theatrical control system;
using the processor to determine if the first DMX value is within a first range of DMX values;
if the first DMX value is within the first range of DMX values, using the processor to select a first frame of data of a plurality of frames of data of a first graphical content program of the plurality of graphical content programs in memory, and if the first DMX value is within the first range of DMX values, using the first frame of data to cause:

the first light emitting diode to be illuminated to a first percent illumination;

the second light emitting diode to be illuminated to a second percent illumination; and the third light emitting diode to be illuminated to a third percent illumination;

wherein the first percent illumination, the second percent illumination, and the third percent illumination are different from each other; and further comprising using the processor to determine if the first DMX value is within a second range of DMX values;

if the first DMX value is within the second range of DMX values, using the processor to select a second frame of data of the plurality of frames of data of the first graphical content program of the plurality of graphical content programs, wherein the first range is different from the second range, the second frame of data is different from the first frame of data, and further comprising if the first DMX value is within the second range of DMX values using the second frame of data to cause:

the first light emitting diode to be illuminated to a fourth percent illumination;

the second light emitting diode to be illuminated to a fifth percent illumination; and a third light emitting diode to be illuminated to a sixth percent illumination; and wherein the fourth percent illumination, the fifth percent illumination, and the sixth percent illumination are different from each other.

7. The method of claim 6 wherein the first range of DMX values and the second range of DMX values together make up all the possible DMX values for the first DMX channel.

8. The method of claim 7 wherein there is no overlap between the first range of DMX values and the second range of DMX values.

9. The method of claim 6 wherein the first DMX value is received from an input device.

10. The method of claim 9 wherein the input device is a slider.

* * * * *